Nov. 28, 1933.                G. SUNDBACK                1,937,299
                            SEPARABLE FASTENER
                         Original Filed Dec. 14, 1929
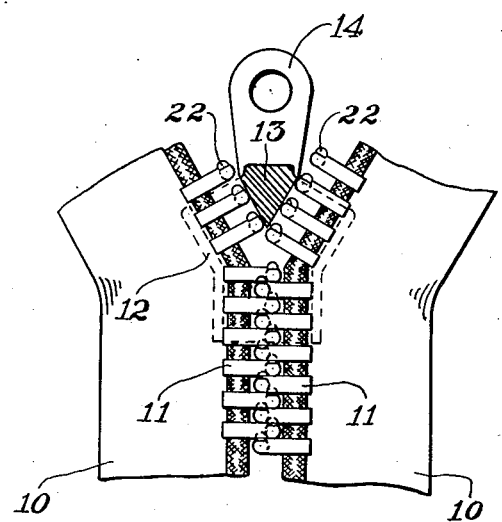
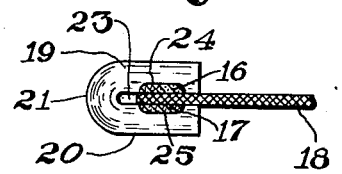
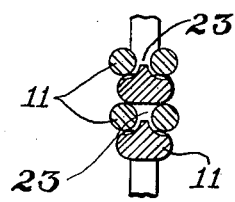
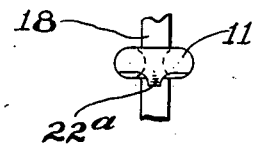
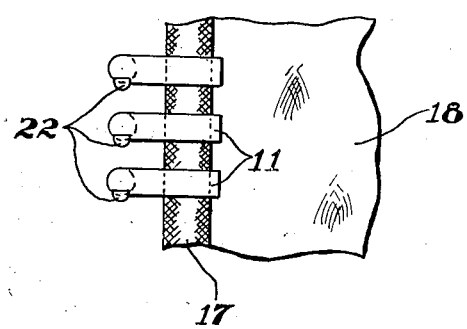
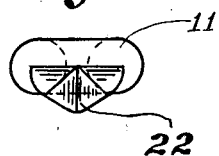
INVENTOR.
Gideon Sundback
BY  R. S. Kelley
ATTORNEY Patented Nov. 28, 1933

1,937,299

UNITED STATES PATENT OFFICE 1,937,299

SEPARABLE FASTENER

Gideon Sundback, Meadville, Pa., assignor to Hookless Fastener Co., a corporation of Pennsylvania Original application December 14, 1929, Serial No. 414,157. Divided and this application January 28, 1932. Serial No. 589,421

5 Claims. (Cl. 24—205)

My invention relates to separable fasteners of the type comprising separable interlocking elements usually engaged and disengaged by a slider.

This application is a division of my co-pending application Serial No. 414,157, filed December 14, 1929.

An object of my invention is to provide an improved form of fastener especially adaptable for manufacture by the simple method described and claimed in the above application.

Another object is to provide an improved form of fastener element in which a narrow projection on one side interlocks with a narrow slot in a corresponding element, such slot being on the opposite side of the element from the projection and being located nearer the stringer than said projection.

Still another object of the invention is to provide an improved form of bent wire fastener element in which there is a projection struck up on one side and an interlocking recess or slot on the opposite side formed solely by the space between the side portions of the element, thus avoiding the additional expense of specially forming a recess on one side of the element. Such construction also has the advantage of maintaining all of the strength of the wire in the section at the bend, since no metal is displaced in forming the recess.

Other objects and advantages of my invention will appear during the course of the following specification.

In the accompanying drawing I have shown for purposes of illustration two embodiments which my invention may assume in practice. In the drawing:

Fig. 1 is a plan view of a fastener constructed in accordance with my invention, part of the slider being broken away to facilitate illustration;

Fig. 2 is a fragmentary sectional view on line 2—2 of Fig. 1;

Fig. 3 is a plan view of a portion of a single fastener stringer having elements made according to my invention;

Fig. 4 is a cross sectional view through such a stringer showing the recess side of the fastener element;

Fig. 5 is a front elevation view of a portion of a fastener stringer showing one of the fastener elements;

Fig. 6 is a front elevation of a fastener element of modified form; and

Fig. 7 is a side view of one of the elements of the form shown in Fig. 6.

Fastening devices of the type to which my invention relates usually comprise a pair of flexible stringers such as those designated 10 in the drawings, each having a series of spaced fastener elements 11 attached along one longitudinal edge. The fastener elements on opposite stringers are arranged in staggered relation so that they will mesh between one another in interlocking. A slider such as indicated at 12 is usually employed to bring the fastener elements together successively at an angle to each other and to cause interlocking of such elements as it travels along the stringers. This general principle of interlocking is well known in the art.

The slider illustrated comprises a pair of overlying spaced wings positioned on opposite sides of the stringer and connected by an integral wedge-shaped portion 13. The flanges on the slider wings and such wedge-shaped portion define a Y-shaped channel through which the fastener elements are guided as the slider is moved along the stringers. A pull member 14 is suitably connected to the slider for conveniently actuating the same.

The stringer construction may be the same as any of those in common use. A woven or braided tape 18 of sufficient width for attachment to the article to be fastened has a corded edge built up along one side preferably by the attachment of separate cords 16 and 17 on opposite sides of the flat tape.

The fastener elements 11 are alike on both stringers and a description of the construction of one of the elements will be sufficient. Such an element preferably comprises a continuous piece of metal such as a round wire bent to substantially U-shape providing spaced side portions 19 and 20 and an integral connecting portion 21 at the bend. The side portions are formed to provide suitable attaching means or clamping jaws by suitable indentations 24 and 25 which engage the cords 16 and 17 when the fastener element is clamped to the edge of the stringer. The interlocking devices comprise a projection 22 formed by striking up metal from opposite edges and toward the middle on one side of the element, said projection being narrow and elongated in the direction of the clamping jaws; and a recess or slot on the opposite side of the element provided solely by the space between the side portions 19 and 20, and located between the connecting portion and the stringers. It will also be noted that this slot is elongated in the same direction as the projection and is of such size to receive loosely the projection 22 of an adjacent element.

A modification of the fastener element construction is indicated at Figs. 6 and 7 in which the projection is formed by striking up metal from the front lower part of the element looking at a front view as in Fig. 6, instead of wholly on the under side of the element as in Fig. 5.

The projection 22a thus provided is of slightly different form and may be preferred from the standpoint of manufacture but the interlocking principle is substantially the same as in the other form of element.

As a result of my invention it will be observed that an improved fastener has been devised having a novel wire element construction in which no special formation of interlocking recess is required and in which the interlocking projection is of novel form. The strength of the individual elements is much greater than in former elements of the wire type because the section at the bend which determines the resistance to spreading of the clamping jaws, is not weakened by displacing metal to form a recess. A wire fastener element of great strength and one which may be preferred in many instances, is thus produced.

While I have in this application described two embodiments which my invention may assume in practice, it will be understood that these embodiments are merely for the purposes of illustration and description and that various other forms may be devised within the scope of my invention as defined in the appended claims.

What I claim as my invention is:

1. In a separable fastener, a pair of stringers having fastener elements attached along their adjacent edges, each of said elements comprising a single piece of wire bent to substantially U-shape to provide side attaching portions, and a connecting portion at the bend projecting from the stringers, said wire at the inner side of said bend being undeformed, a projection struck up on one side of said connecting portion, and a recess on the opposite side of the element provided solely by the space between said side portions adjacent the bend, the projections on one stringer being adapted to interlock with the recesses of elements on the other stringer.

2. In a separable fastener, a pair of flexible stringers having fastener elements along their adjacent edges, each of said elements comprising a single piece of substantially round wire bent to U-shape to provide side portions engaging around the edge of a stringer, and a connecting portion at the bend, a projection struck up on one side of said connecting portion and a slot formed solely by the space between said side portions and located between said connecting portion and the edge of the stringer, said projections on one stringer adapted to engage in said slots on the opposite stringer when the fastener elements are interlocked.

3. In a separable fastener, a fastener element comprising a continuous piece of metal bent to substantially U-shape providing spaced side portions forming clamping jaws for attachment to a stringer, and a connecting portion adjacent the bend, said strip being deformed on one side of said connecting portion to form a projection and being undeformed on the opposite side and also on the inner side of said bend, said side portions adjacent the bend being spaced apart to provide an interlocking recess.

4. In a separable fastener, a fastener element comprising a continuous strip bent to substantially U-shape to form side attaching portions, and a connecting portion at the bend, said wire being undeformed on the inner side of said bend and a projection formed on one side of said connecting portion by striking up metal from opposite edges toward the middle, said side portions adjacent the bend being spaced apart to form an interlocking recess on the opposite side of the element from said projection.

5. In a separable fastener, a fastener element comprising spaced clamping jaws and an integral connecting portion joining said jaws, a projection formed adjacent the middle of said connecting portion and on one side thereof, said projection being elongated in a direction parallel to said clamping jaws, and a slot between said clamping jaws and connecting portion on the opposite side of the element for interlocking with a projection of a similar element.

GIDEON SUNDBACK.